United States Patent [19]

Butler

[11] Patent Number: 5,646,792

[45] Date of Patent: Jul. 8, 1997

[54] LONG-LIFE SELF-RENEWING SOLAR REFLECTOR STACK

[75] Inventor: Barry Lynn Butler, Solana Beach, Calif.

[73] Assignee: Science Applications International Corporation, San Diego, Calif.

[21] Appl. No.: 393,472

[22] Filed: Feb. 24, 1995

[51] Int. Cl.$^6$ ........................................ B32B 7/06
[52] U.S. Cl. .................... 359/883; 428/40.1; 126/684
[58] Field of Search .................................. 359/883, 884, 359/868; 428/40–42; 126/684, 685, 687, 608, 570, 907, 908

[56] References Cited

U.S. PATENT DOCUMENTS

| | | | |
|---|---|---|---|
| 4,149,902 | 4/1979 | Mauer et al. | 136/89 |
| 4,199,620 | 4/1980 | Edwards et al. | 427/156 |
| 4,229,077 | 10/1980 | Schwab | 350/293 |
| 4,287,266 | 9/1981 | Myles | 428/596 |
| 4,328,276 | 5/1982 | Swarovski | 428/213 |
| 4,482,209 | 11/1984 | Grewal et al. | 350/642 |
| 4,499,130 | 2/1985 | Questel et al. | 428/42 |
| 4,511,618 | 4/1985 | Duchene et al. | 428/215 |
| 4,543,295 | 9/1985 | St. Clair et al. | 428/458 |
| 4,581,268 | 4/1986 | Ohe et al. | 428/42 |
| 4,634,637 | 1/1987 | Oliver et al. | 428/622 |
| 4,724,010 | 2/1988 | Okaniwa et al. | 136/246 |
| 4,837,061 | 6/1989 | Smits et al. | 428/40 |
| 4,837,088 | 6/1989 | Freedman | 156/243 |
| 4,853,283 | 8/1989 | Skolnick | 428/335 |
| 4,927,702 | 5/1990 | Mühlratzer et al. | 428/215 |
| 4,968,372 | 11/1990 | Maass | 156/249 |
| 5,089,341 | 2/1992 | Yoshimura et al. | 428/412 |
| 5,118,540 | 6/1992 | Hutchinson | 428/40 |
| 5,254,447 | 10/1993 | Meyer et al. | 430/510 |

Primary Examiner—Timothy P. Callahan
Assistant Examiner—Eunja Shin
Attorney, Agent, or Firm—Banner & Witcoff, Ltd.

[57] ABSTRACT

A long-life solar reflector includes a solar collector substrate and a base layer bonded to a solar collector substrate. The first layer includes a first reflective layer and a first acrylic or transparent polymer layer covering the first reflective layer to prevent exposure of the first reflective layer. The reflector also includes at least one upper layer removably bonded to the first acrylic or transparent polymer layer of the base layer. The upper layer includes a second reflective layer and a second acrylic or transparent polymer layer covering the second reflective layer to prevent exposure of the second reflective layer. The upper layer may be removed from the base reflective layer to expose the base layer, thereby lengthening the useful life of the solar reflector. A method of manufacturing a solar reflector includes the steps of bonding a base layer to a solar collector substrate, wherein the base reflective layer includes a first reflective layer and a first transparent polymer or acrylic layer covering the first reflective layer; and removably bonding a first upper layer to the first transparent polymer or acrylic layer of the base layer. The first upper layer includes a second reflective layer and a second transparent polymer or acrylic layer covering the second reflective layer to prevent exposure of the second reflective layer.

14 Claims, 2 Drawing Sheets

LONG-LIFE SELF-RENEWING SOLAR REFLECTOR STACK

FIELD OF THE INVENTION

The present invention relates to a long-life self-renewing solar reflector stack formed by stacking a number of polymer reflecting films. The reflecting films are stacked and removably bonded together, and each layer is bonded less strongly than the previous layer. After a period of time, the top reflector layer may be peeled off to expose a new reflector layer underneath.

The present invention also relates to a method of manufacturing a solar reflector by stacking multiple reflective layers which are bonded together by bonds of decreasing strength, thereby ensuring that each reflective layer can be easily peeled off to expose a new reflective layer.

BACKGROUND OF THE INVENTION

The process of channeling solar radiation to produce electric power is often accomplished through the use of heliostats, instruments consisting of one or more mirrors mounted on an axis which are moved by computerized clockwork to steadily reflect solar radiation in a predetermined direction (heliostat=sun's reflection in a constant direction). An example of a heliostat with two mirrors is shown in FIG. 1.

The mirrors on heliostats or dishes which are used to focus the solar radiation, known as "reflectors," may be many meters in diameter and are constantly exposed to the environment. As a result, over a period of time, the surface of reflectors is degraded by this exposure, and the reflector is no longer useful. At this time, the surface of the reflector or the reflector itself must be replaced.

Known methods for protecting the reflector surface from the environment include the use of laminated glass reflectors and plastic reflectors. Laminated glass reflectors include a reflective metal layer sandwiched between two glass sheets. These reflectors have a life span of approximately thirty years. They are scratch-resistant and therefore may be cleaned using ordinary soap and water. The glass layers are also impermeable to water and prevent water corrosion of the underlying reflective metal layer. However, glass reflectors are heavy and costly due to the increase in structural weight of the reflector, which is significant even when very thin glass is used. Glass is also vulnerable to hail and other impacts which result in exposure of the reflective metal layer. Glass is high in stiffness, and has a smaller coefficient of thermal expansion in comparison to the metal frame that supports the glass. Therefore, the glass must be applied as tiles of less than one square meter each.

Plastic (polymer film) reflectors include a layer of transparent plastic covering a reflective metal layer. Plastic reflectors are lighter, less expensive, and more flexible than glass reflectors. Layers of plastic can be adhered to metal substrates as a single sheet as wide as 1.5 meters and 10's of meters in length. Plastics have a higher coefficient of thermal expansion than metals, but their flexibility allows them to be bonded over large areas to metal support structures as a single piece. However, the plastic may be scratched during ordinary cleaning and therefore becomes dull over time. Furthermore, plastics are permeable and allow water to reach the underlying reflective metal layer, causing corrosion. As a result of these drawbacks, plastic reflectors have a life span of approximately seven to ten years.

A possible solution to the degradation problem of plastic reflectors is to remove the worn outer plastic layer and replace it with a new layer to lengthen the usable life of the reflector. However, the process of replacing the outer plastic layer is cumbersome, results in a coating that is inferior to the original coating, and is expensive to the point of being economically infeasible. For example, the replacement process often results in particles from the environment being trapped between the plastic sheet and the metal structure layer, thereby distorting the reflector. Also, the replacement sheet may not be properly tensioned and sealed to the reflective layer such that moisture may seep in and corrode the reflective metal layer.

SUMMARY OF THE INVENTION

A long-life solar reflector according to the present invention includes a solar collector substrate and a base layer bonded to said solar collector substrate. The base layer includes a first reflective layer and a first transparent layer, such as an acrylic or transparent polymer layer, covering the first reflective layer to prevent exposure of the first reflective layer. The reflector also includes at least one upper layer removably bonded to the first acrylic or transparent polymer layer of the base layer. The upper layer includes a second reflective layer and a second transparent layer, such as an acrylic or transparent polymer layer, covering the second reflective layer to prevent exposure of the second reflective layer. The upper layer may be removed from the base reflective layer to expose the base layer, thereby lengthening the useful life of the solar reflector.

Another embodiment of the long-life solar reflector according to the present invention includes all of the features described above and has two upper layers. A first of the two upper layers is removably bonded to the first transparent layer of the base layer, and a second of the two upper layers is removably bonded to the second transparent layer of the first upper layer. Furthermore, the second upper layer is less strongly bonded to the first upper layer than the first upper layer is bonded to the base layer.

A method of manufacturing a solar reflector according to the present invention includes the steps of bonding a base layer to a solar collector substrate, wherein the base reflective layer includes a first reflective layer and a first transparent layer covering the first reflective layer; and removably bonding a first upper layer to the first transparent layer of the base layer. The first upper layer includes a second reflective layer and a second transparent layer covering the second reflective layer to prevent exposure of the second reflective layer.

The apparatus and method according to the present invention as described above may provide the advantages of plastic reflectors and the life span of glass reflectors, i.e., a low cost, light-weight, easily applied reflector layer capable of a 90% solar reflectance average over thirty years. The apparatus and method according to the present invention may also have the additional advantage that all necessary reflective layers are applied to the reflector in the factory under ideal conditions to insure that each of the underlying reflective layers will be properly tensioned, flat, and properly sealed to prevent ingress of moisture.

The foregoing and other features, aspects, and advantages of the present invention will become more apparent from the following detailed description when read in conjunction with the accompanying drawings.

DETAILED DESCRIPTION

The reflector stack according to the present invention will now be described with reference to FIG. 2. The reflective stack illustrated in FIG. 2 includes three reflective layers. However, the present invention includes the use of two or more reflective layers in forming the reflector stack and is not limited to the three-layer structure shown in FIG. 2.

Figure 1:
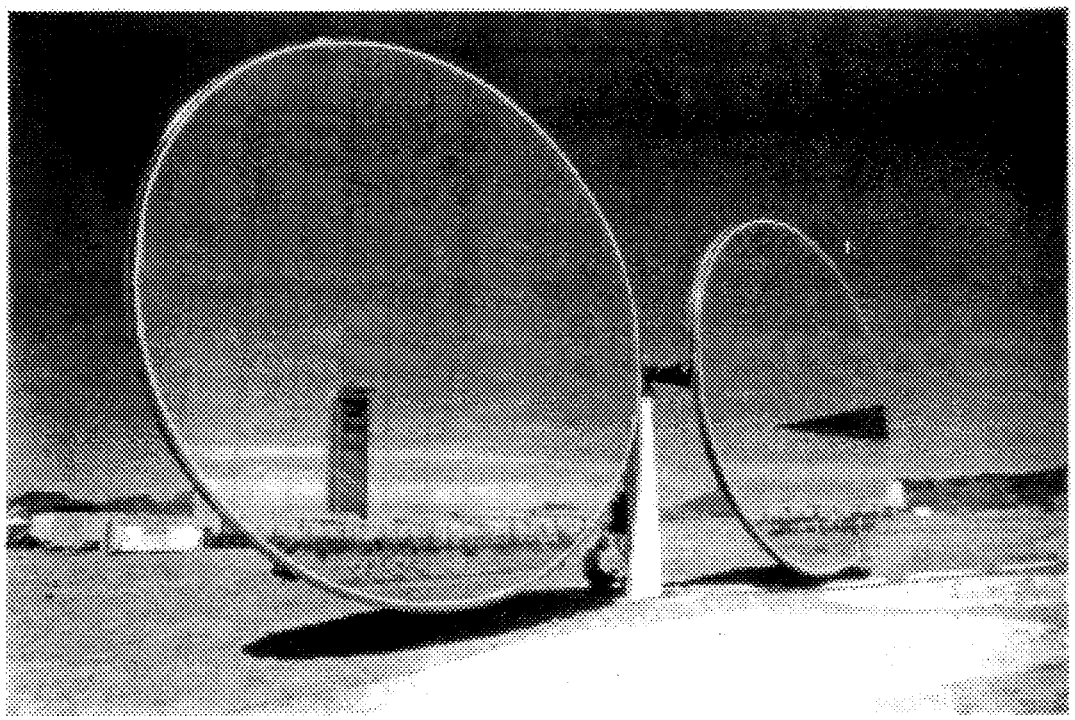
FIG. 1 shows an example of a heliostat including two reflectors.
Figure 2:
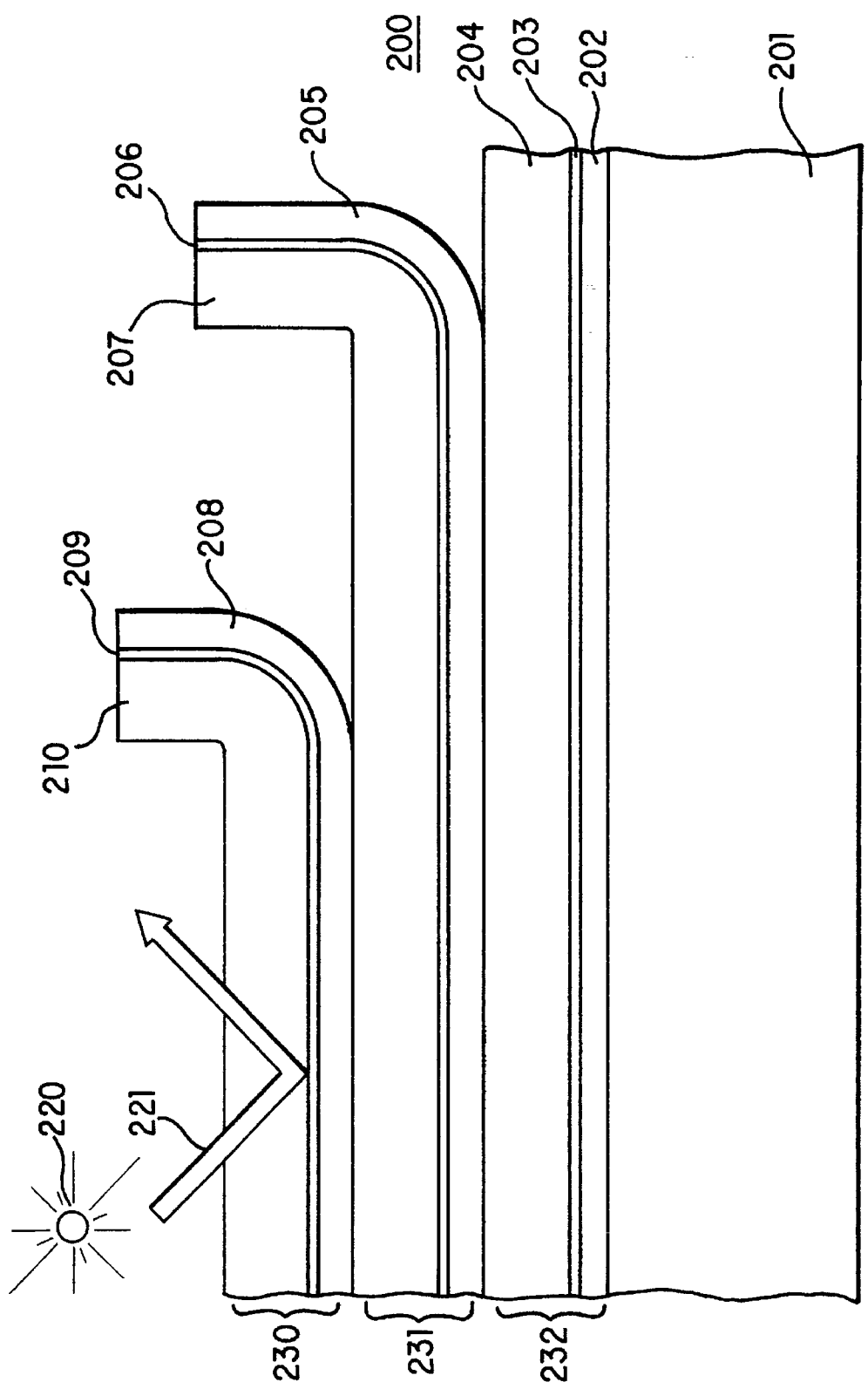
FIG. 2 provides a diagram of the reflective stack according to the present invention, including three reflective layers bonded together.

As shown in FIG. 2, the reflector stack 200 includes three reflective layers 230, 231, and 232 which are applied to a solar collector substrate 201. The top layer 230 includes a weathered acrylic layer 210 which has been exposed to radiation 221 from the sun 220 and other weather and environmental conditions; a silver reflector layer 209; and a low tack adhesive layer 208. The low-tack adhesive layer 208 bonds the top layer 230 to the second layer 231 while allowing for easy removal of the top layer 230 from the second layer 231 by peeling the top layer 230 away. Thus, the top layer 230 may be peeled off to reveal a new reflective layer 231 once the lifetime of the top layer 230 has expired.

Similarly, the second layer 231 has an acrylic layer 207, a silver reflective layer 206, and a low tack adhesive layer 205. Low-tack adhesive layer 205 bonds second reflective layer 231 to a third reflective layer 232, while allowing for easy removal of the second layer 231 by peeling the second layer 231 off to reveal the third reflective layer 232 once the lifetime of second reflective layer 231 has expired.

The third reflective layer 232 includes an acrylic layer 204 and a silver reflective layer 203 like the layers 230 and 231 above it. However, third layer of 232 is bonded to the solar collector substrate 201 using an adhesive layer 202 which does not necessarily allow for peeling of the third layer 232 from the surface of the solar collector substrate 201.

The three layers 230, 231, and 232 are bonded by adhesive bonds of increasing strength to insure that the top layer 230 may be removed without removing the second layer 231 or third layer 232, and that the second layer 231 may be removed without removing third layer 232. To achieve this result, third layer 232 is bonded to the solar collector substrate using an adhesive layer 202. The adhesive used in layer 202 consists of, for example, approximately 30% glass microspheres (also known as micro-balloons). As a result, the adhesive in adhesive layer 202 contacts approximately 70% of the surface of the solar collector substrate 201. A full adhesive containing no glass microspheres may also be used to form adhesive layer 202. The bond formed between adhesive layer 202 and solar collector substrate 201 is the strongest of the bonds used in reflector 200.

Next, the second layer 231 is bonded to the third layer 232 using a low-tack adhesive layer 205. The low-tack adhesive used in adhesive layer 205 consists of, for example, approximately 50% glass microspheres. As a result, the adhesive in adhesive layer 205 only contacts approximately 50% of the acrylic layer 204 of the third layer 232. This creates a weaker bond between the second layer 231 and the third layer 232 than exists between third layer 232 and solar collector substrate 201.

Then, the top layer 230 is bonded to the second layer 231 using a low-tack adhesive layer 208. The low-tack adhesive used in adhesive layer 208 consists of, for example, approximately 80% glass microspheres. As a result, the adhesive in adhesive layer 208 only contacts approximately 20% of the acrylic layer 207 of the second layer 231. This creates a weaker bond between the top layer 230 and the second layer 231 than exists between second layer 231 and the third layer 232.

The adhesive layers 202, 205, and 208 for use in the reflector stack according to the present invention must have sufficient tack to hold the reflective layers together to maintain an optically accurate surface and prevent the ingress of moisture between the reflective layers. The adhesive in adhesive layers 205 and 208 must also allow for the clean, complete removal of reflective layers 231 and 230 respectively at the end of their lifetimes without disturbing the underlying reflective layers. One such adhesive is a limited-tack or "low-tack" adhesive made by the 3M Company of St. Paul, Minn. in which the percentage of glass microspheres may be varied to produce bonds of varying strength.

One possible type of film that may be used to construct reflective layers 203, 206, and 209 and acrylic layers 204, 207, and 210 of the reflector stack according to the present invention is a highly specular silver-polymer (PMMA) solar reflecting film, 3M Brand ECP 305 Plus, made by the 3M Company of St. Paul, Minn. This film includes an acrylic (PMMA) layer, a silver layer, and a copper layer. Therefore, the reflective layers 203, 206, and 209 shown in FIG. 2 include a silver layer and a copper layer if 3M Brand ECP 305 Plus is used. However, other types of reflective films may be used without departing from the scope of the present invention. Also, other types of transparent films, for example, transparent polymer films, may be used in place of the acrylic films described above with reference to FIG. 2.

The solar collector substrate 201 may be a metal foil/sheet or a mylar (polyester) substrate. However, other types of solar collector substrate materials may be used without departing from the scope of the present invention.

While the present invention has been particularly described with reference to the preferred embodiments, it should be readily apparent to those of ordinary skill in the art that changes and modifications in form and details may be made without departing from the spirit and scope of the invention. It is intended that the appended claims include such changes and modifications.

I claim:

1. A solar reflector, comprising:
    a solar collector substrate;
    a base layer bonded to said solar collector substrate, said base layer including a first reflective layer and a first transparent layer covering said first reflective layer; and
    a first upper layer removably bonded to said first transparent layer of said base layer, said first upper layer including a second reflective layer and a second transparent layer covering said second reflective layer, wherein said upper layer may be removed from said base layer to expose said base layer.

2. A solar reflector according to claim 1, further comprising a second upper layer, said second upper layer including a third reflective layer and a third transparent layer covering said third reflective layer, wherein said second upper layer is removably bonded to said second transparent layer of said first upper layer.

3. A solar reflector according to claim 2, wherein said second of said two upper layers is less strongly bonded to said first of said two upper layers than said first of said two upper layers is bonded to said base layer.

4. A method of manufacturing a solar reflector, comprising the steps of:
    bonding a base layer to a solar collector substrate, said base layer including a first reflective layer and a first transparent layer covering said first reflective layer; and removably bonding a first upper layer to said first transparent layer of said base layer, said first upper layer including a second reflective layer and a second transparent layer covering said second reflective layer to prevent exposure of said second reflective layer.

5. A method according to claim 4, further comprising the step of:

removably bonding a second upper layer to said second transparent layer of said first upper layer, said second upper layer including a third reflective layer and a third transparent layer covering said third reflective layer.

6. A method according to claim 5, wherein said second upper layer is less strongly bonded to said first upper layer than said first upper layer is bonded to said base layer.

7. A solar reflector according to claim 1, wherein said first and second reflective layers are silver layers, said first and second transparent layers are acrylic layers, and said first upper layer and said base layer are removably bonded by a low-tack adhesive.

8. A method according to claim 4, wherein said first and second reflective layers are silver layers, said first and second transparent layers are acrylic layers, and said first upper layer and said base layer are removably bonded by a low-tack adhesive.

9. A method of using a solar reflector, said solar reflector comprising a solar collector substrate, a base reflective layer bonded to said solar collector substrate, and an upper reflective layer removably bonded to said base reflective layer by a low-tack adhesive, said method comprising the steps of:

exposing said upper reflective layer of said solar reflector to the environment for a predetermined period of time; and removing said upper reflective layer to expose said base reflective layer.

10. A method according to claim 9, wherein said base reflective layer and said upper reflective layer each comprise a metal reflective layer and a protective transparent layer covering said metal reflective layer.

11. A solar reflector according to claim 10, wherein said metal reflective layer is a silver reflective layer and said protective transparent layer is an acrylic layer.

12. A solar reflector, comprising:

a solar collector substrate;

a base reflective layer bonded to said solar collector substrate; and at least one upper reflective layer removably bonded to said base reflective layer by a low-tack adhesive.

13. A solar reflector according to claim 12, wherein said base reflective layer and said at least one upper reflective layer each comprise a metal reflective layer and a protective transparent layer covering said metal reflective layer.

14. A solar reflector according to claim 13, wherein said metal reflective layer is a silver reflective layer and said protective transparent layer is an acrylic layer.

* * * * *